UNITED STATES PATENT OFFICE.

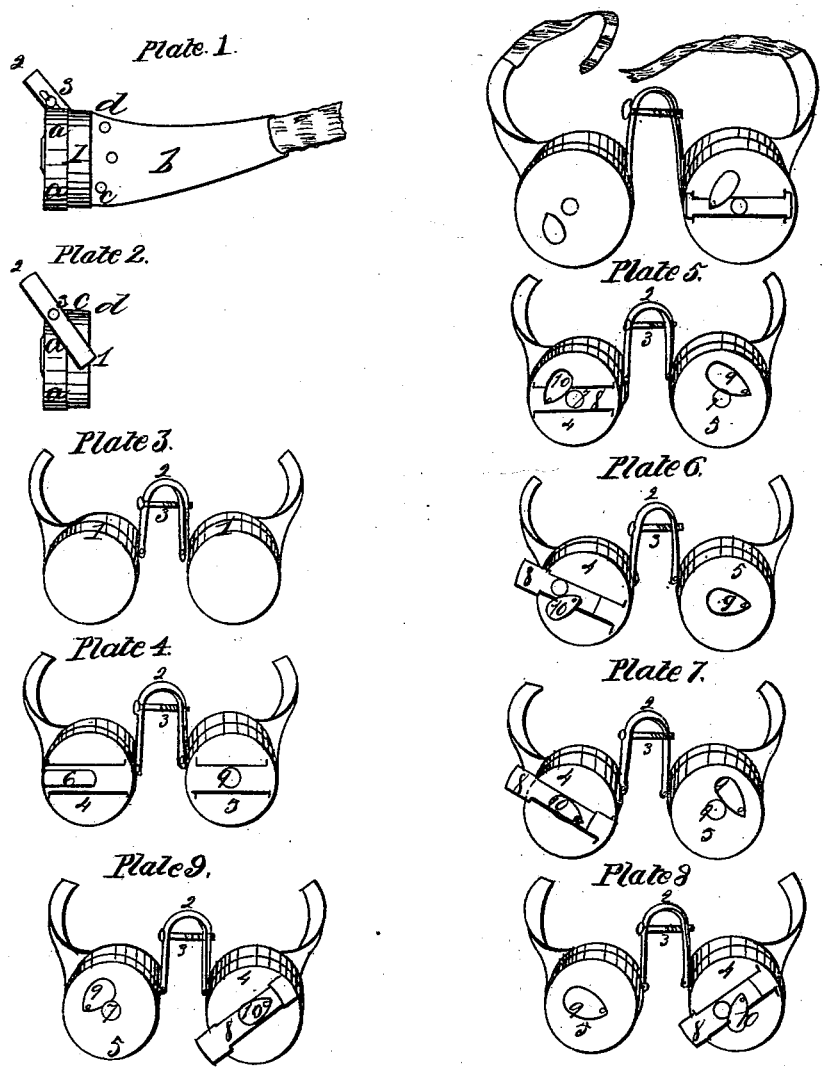

ANDREW LAKE, OF FLATBUSH, NEW YORK.

STRABISMUS-GOGGLES.

Specification of Letters Patent No. 2,838, dated November 4, 1842.

*To all whom it may concern:*

Be it known that I, ANDREW LAKE, of the town of Flatbush, county of Kings, and State of New York, have invented a new and useful Mode of Curing Strabismus or Squinting; and I do hereby declare that the following is an exact and full description.

The nature of my invention consists in, an instrument which is worn by the patient, shaped somewhat like a pair of goggles; which is so constructed, the patient turns the affected eye when looking at objects, in a direction directly opposite to that which it takes, when in the act of squinting.

To enable others skilled in the art to make and use my invention I will proceed to describe its construction and operation.

I cause the patient to wear an instrument fitted to the eyes, consisting of two tubes, made of paper, metal or other material about ⅜ of an inch deep and 1¼ inch in diameter, more or less, as the age or rather the size of the orbit may require (Plates 1, 2, 3, Figure 1). The tubes are connected by a spring, forming an inch over the nose, through this spring passes the thumb screw, which is to regulate the tubes, so as to bring the pupils of the eyes, in their center (Pl. 1, 2, 3, Figs. 2, 3). Upon the bottom edge of each tube is a narrow strip of velvet, india rubber, or any other soft or elastic material, to prevent irritation of the skin when the instrument is in use (Pl. 1, 2 Fig. *a*).

In each shade near the bottom edge of the tubes, is a row of small holes, to admit a free circulation of air at all times. The rays of light which these holes admit, do not however, reach or affect the seat of vision (Pl. 1, 2, Fig. *c*).

Each tube, has a revolving cover which can be removed from one to the other, as the case may require (Pl. 7, 8, Figs. 4, 5). The cover used over the sound eye, has an aperture in its center. Two lines in diameter more or less (Pl. 4 Figs. 5, 7) which can be closed by a pivot slide (Pl. 5, Fig. 9), the object of which is to shut out the light while the instrument is operating upon the affected eye (Pl. 6, 8, Figs. 5, 9); it is also to admit light and images correctly when necessary to rest it (Pl. 7, 9, Figs. 5, 9).

The cover of the tube over the affected eye, has an opening two lines wide, more or less, from its center to its margin (Pl. 4, Figs. 4, 6), which opening is covered by a slide, in which is an aperture two lines in diameter, more or less, which aperture can also be closed by a pivot slide (Pl. 5, Figs. 8, 10); the use of which is to admit light and images when in operation, and exclude them when rest is required (Pl. 7, 9, Fig. 4, 10). The aperture in this part of the instrument by the combined movements of the cover and slide, can be placed in any position which the strabismus may require (Pl. 6, 8)).

The mode of using this instrument after its adjustment consists in closing the aperture over the sound eye, opening the aperture over the one affected, and placing it in such a position, that the patient in order to perceive an object, turns the eye in a direction directly opposite to that which it takes, when in the act of squinting (Pl. 6, 8). The muscles will thus acquire a new habit, counteracting the old habit of squinting; the affected eye is strengthened by being the sole organ of vision while the instrument is in operation; and the new habit becomes permanent.

What I claim as my invention and desire to secure by Letters Patent, is,

The mode of curing strabismus or squinting by causing the patient to see objects with the affected eye, turned in a direction directly opposite to that which it takes when in the act of squinting; whether by the above described instrument or any other the same in principle.

ANDREW LAKE.

Witnesses:
JEREMIAH LOTT,
JOHN B. ZABRISKIE.